(12) United States Patent
Lee

(10) Patent No.: US 9,650,017 B2
(45) Date of Patent: May 16, 2017

(54) ADAPTER FOR SIDE HOOK ARM

(71) Applicant: ALBEREE PRODUCTS, INC., Halethorpe, MD (US)

(72) Inventor: Albert Lee, Halethorpe, MD (US)

(73) Assignee: ALBEREE PRODUCTS, INC., Halethorpe, MD (US)

( * ) Notice: Subject to any disclaimer, the term of this patent is extended or adjusted under 35 U.S.C. 154(b) by 142 days.

(21) Appl. No.: 14/745,904

(22) Filed: Jun. 22, 2015

(65) Prior Publication Data

US 2015/0283977 A1   Oct. 8, 2015

Related U.S. Application Data

(63) Continuation of application No. 13/734,384, filed on Jan. 4, 2013, now Pat. No. 9,061,659.

(60) Provisional application No. 61/583,933, filed on Jan. 6, 2012.

(51) Int. Cl.
*B60S 1/40* (2006.01)
*B60S 1/38* (2006.01)

(52) U.S. Cl.
CPC ......... *B60S 1/4019* (2013.01); *B60S 1/3867* (2013.01); *B60S 1/4006* (2013.01); *B60S 1/4016* (2013.01); *B60S 1/4077* (2013.01); *B60S 2001/4022* (2013.01); *B60S 2001/4032* (2013.01)

(58) Field of Classification Search
CPC .... B60S 1/4006; B60S 1/4009; B60S 1/4016; B60S 1/4019; B60S 2001/4012; B60S 2001/4032; B60S 2001/4022

USPC ........................................................ 15/250.32
See application file for complete search history.

(56) References Cited

U.S. PATENT DOCUMENTS

| 2,102,188 | A |   | 12/1937 | Romano |
|---|---|---|---|---|
| 2,153,224 | A |   | 4/1939 | Zaiger |
| 3,657,762 | A |   | 4/1972 | Arman |
| 3,757,377 | A |   | 9/1973 | Hayhurst |
| 4,318,200 | A |   | 3/1982 | Bauer et al. |
| 4,416,032 | A |   | 11/1983 | Mohnach et al. |
| 5,628,085 | A | * | 5/1997 | Edele .................... B60S 1/4038 |
|   |   |   |   | 15/250.31 |

(Continued)

FOREIGN PATENT DOCUMENTS

DE            44 45 415 A1    6/1996

*Primary Examiner* — Gary Graham
(74) *Attorney, Agent, or Firm* — Birch, Stewart, Kolasch & Birch, LLP

(57) ABSTRACT

An adapter for a windshield wiper assembly is provided. The adapter includes a hooking portion adapted to selectively receive a left hand drive hook or a right hand drive hook of a wiper arm, the hooking portion including a body formed of side plates that are parallel to each other and a connector extending between the side plates such that the side plates extend above and below the connector, the connector extending parallel to the side plates, an attaching portion adapted to be connected to a wiper and a connection portion attached to the hooking portion and the attaching portion at opposite ends. The hooking portion and the attaching portion are positioned in a side-by-side configuration and are parallel to each other. The hooking portion is symmetrical about a central portion so to be capable of selectively receiving the left hand drive hook or the right hand drive hook of the wiper arm.

5 Claims, 6 Drawing Sheets

(56) References Cited

U.S. PATENT DOCUMENTS 6,258,078 B1 7/2001 Thilly
8,261,403 B2 9/2012 Ehde

* cited by examiner

ADAPTER FOR SIDE HOOK ARM

CROSS REFERENCE TO RELATED APPLICATION

This application is a Continuation of U.S. patent application Ser. No. 13/734,384, filed Jan. 4, 2013, which claims the benefit of U.S. Provisional Application No. 61/583,933 filed on Jan. 6, 2012, the disclosures of which are hereby expressly incorporated by reference.

BACKGROUND OF THE INVENTION

Field of the Invention

Embodiments of the invention are directed generally to adapters for a windshield wiper arm. More particularly, the embodiments of the invention are directed to adapters configured to cooperate with one or more windshield wiper arm having a side hook design.

Discussion of the Related Art

Various types of windshield wiper arms are available which utilize respective adapters for connection of windshield wiper assemblies to the windshield wiper arms, respectively. Thus, a particular adapter may be usable with a particular type of windshield wiper arm.

SUMMARY OF THE INVENTION

Accordingly, it is an object of the invention to provide adapters usable with different windshield wiper arms of windshield wiper assemblies.

According to an embodiment of the present invention, an adapter for a windshield wiper assembly includes a hooking portion adapted to receive a hook of a wiper arm, an attaching portion adapted to be connected to a wiper, and a connection portion attached to the hooking portion and the attaching portion at opposite ends. The hooking portion and the attaching portion are positioned in a side-by-side configuration and are parallel to each other.

DESCRIPTIONS OF THE DRAWINGS

The accompanying drawings, which are included to provide a further understanding of the invention and are incorporated in and constitute a part of this specification, illustrate embodiments of the invention and together with the description serve to explain the principles of the invention. The embodiments of the adapter of the invention are shown in the attached drawings, and an adapter and windshield wiper arm are configured to cooperate as shown in some of the drawings. In the drawings.

DETAILED DESCRIPTION OF THE EMBODIMENTS

Figure 1:
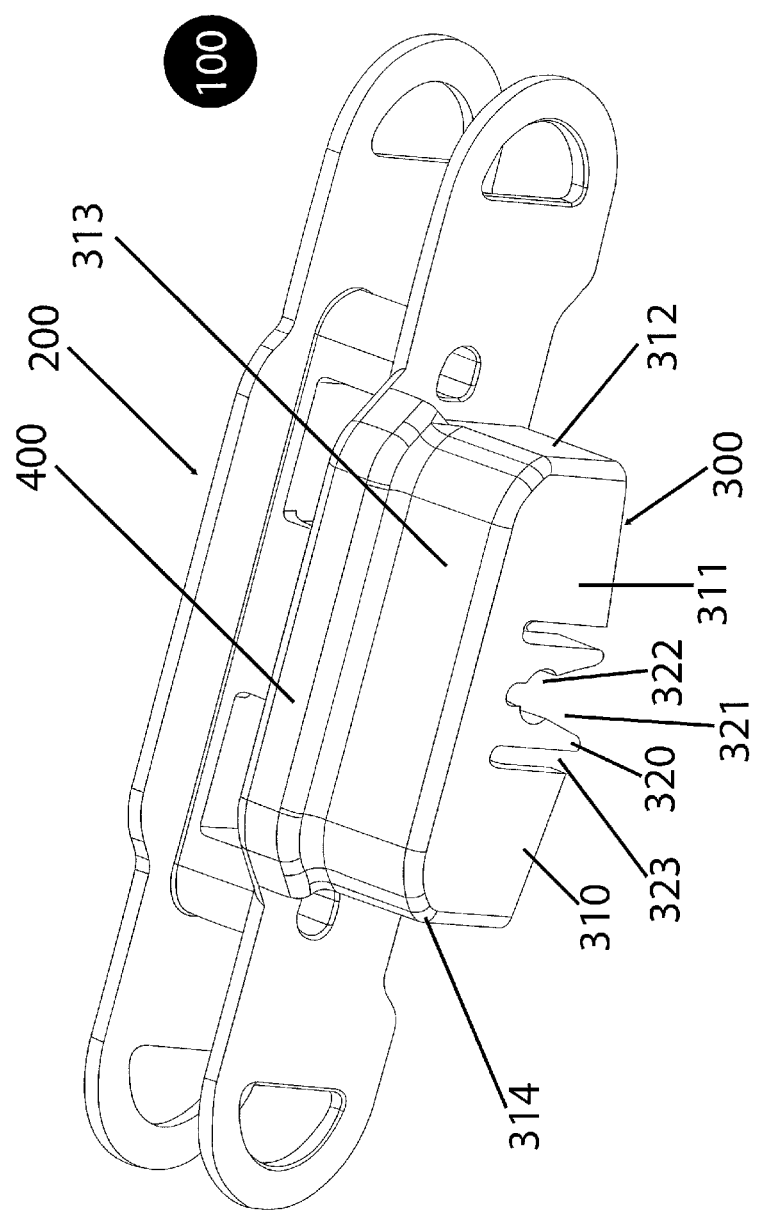
FIG. 1 shows a perspective view of an adapter according to an embodiment of the invention.

Hereinafter, example embodiments of this invention will be described in detail with reference to FIGS. 1-6. Like reference numerals designate like elements throughout the specification. The drawings show several views of an adapter, and also show several views of the adapter and a windshield wiper arm in an attached configuration. The adapter has a first portion that receives or cooperates with a windshield wiper arm and a second portion that extend from the first portion. The first portion has one or more locks that are arranged, and/or has one or more lock releases that are also arranged. The windshield wiper arm may be a side hook design, and may be a 9×3 hook or a 9×4 hook. The adapter is usable with either a right or left hand drive seat automobile.

Figure 2:
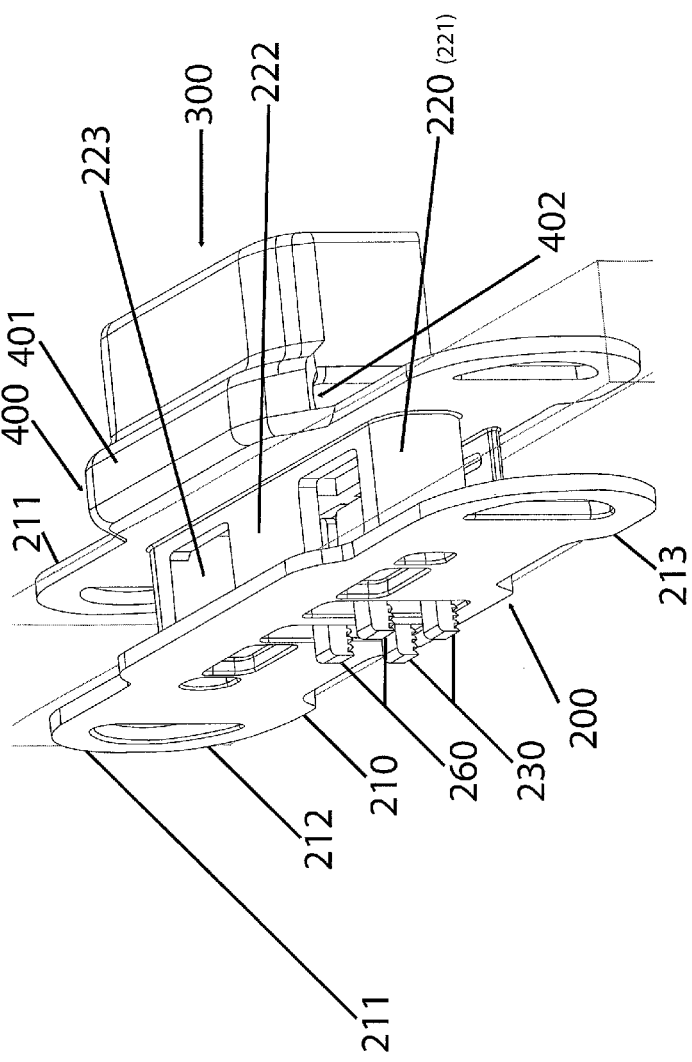
FIG. 2 shows another perspective view of the adapter according to an embodiment of the invention from a different angle.
Figure 3:
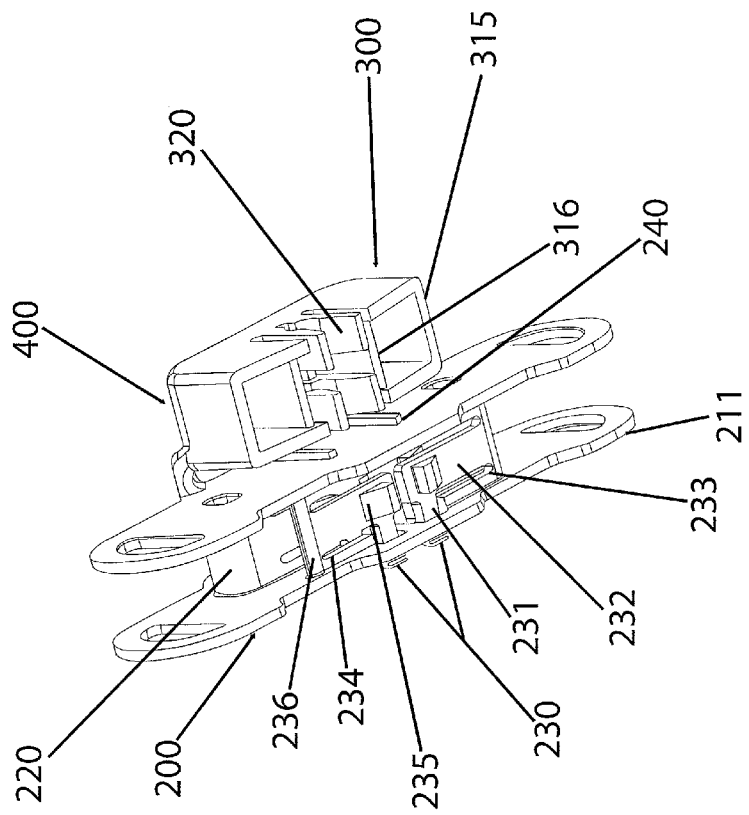
FIG. 3 shows a perspective view from a bottom angle of the adapter according to an embodiment of the invention.
Figure 4:
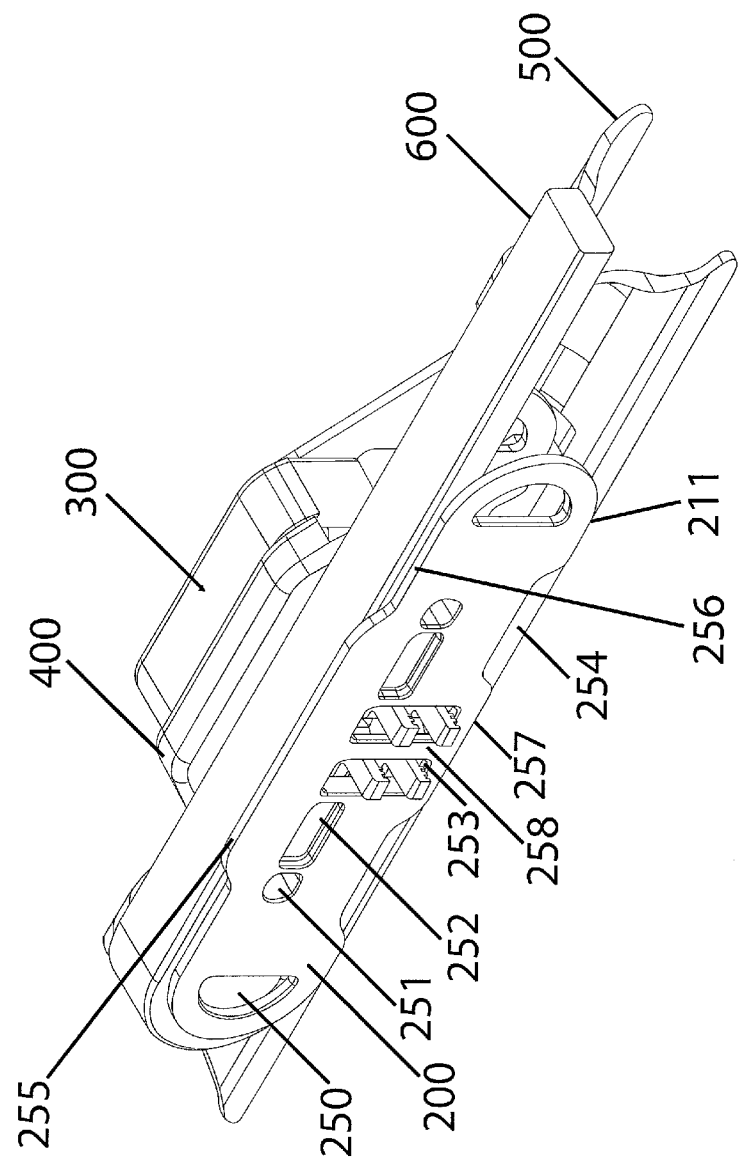
FIG. 4 shows a perspective view of the adapter according to an embodiment of the invention cooperating with a 9×4 hook.
Figure 5:
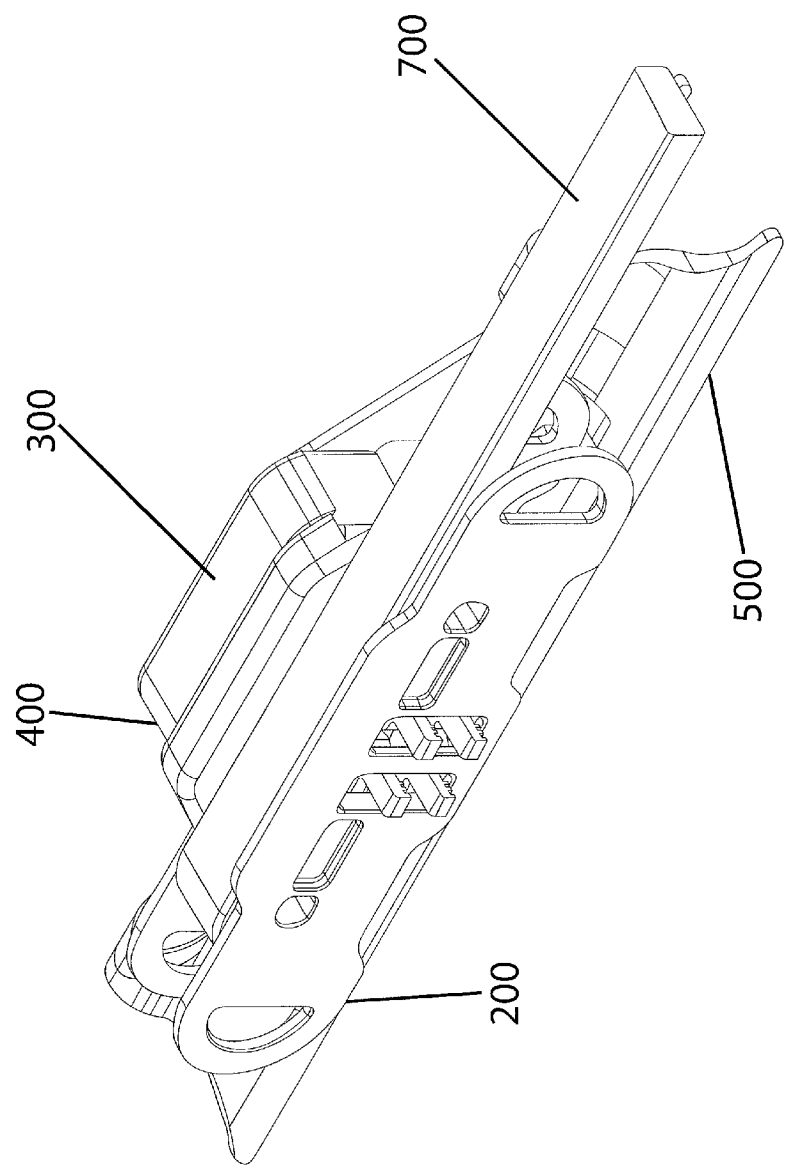
FIG. 5 shows a perspective view of the adapter according to an embodiment of the invention cooperating with a 9×3 hook.
Figure 6:
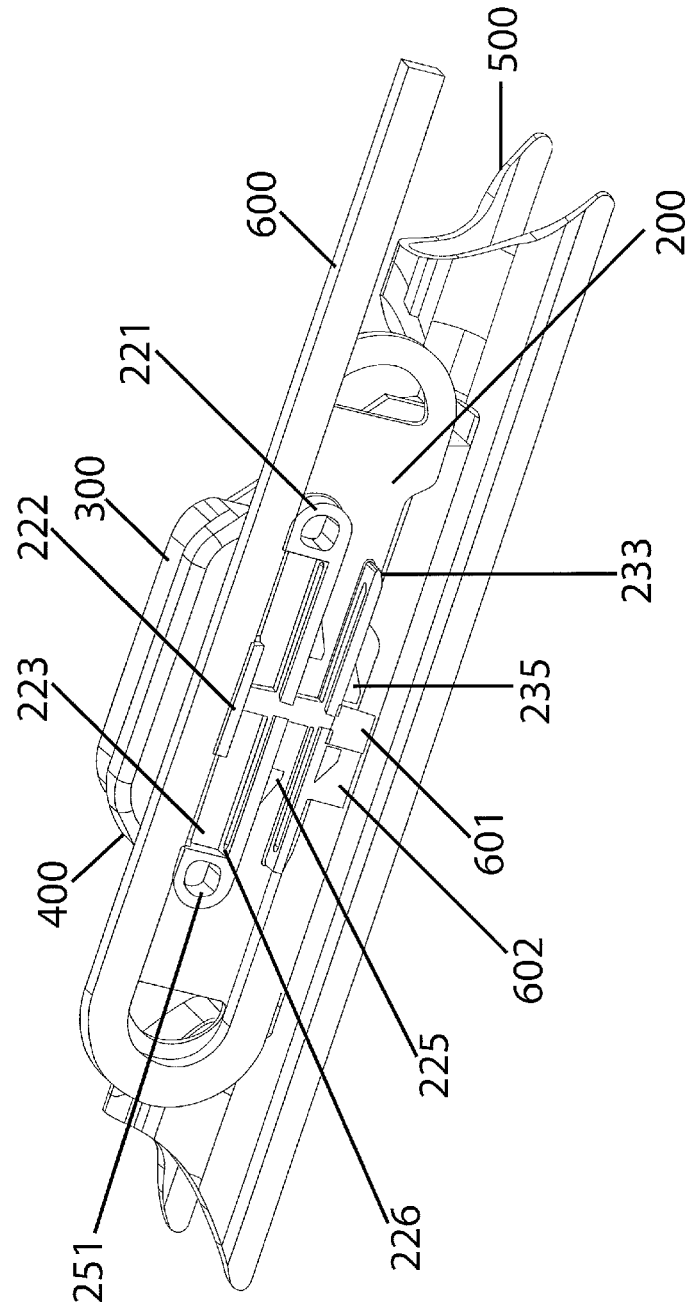
FIG. 6 shows a perspective view of the adapter according to an embodiment of the invention cooperating with a hook of a windshield wiper arm.

FIG. 1 shows a perspective view of the adapter. FIG. 2 shows another perspective view of the adapter from a different angle, and shows locks and/or lock releases. FIG. 3 shows a perspective view from a bottom angle. FIG. 4 shows a perspective view of the adapter cooperating with a 9×4 hook. FIG. 5 shows a perspective view of the adapter cooperating with a 9×3 hook. FIG. 6 shows a perspective view of the adapter cooperating with a hook of a windshield wiper arm, and having the locks and/or lock releases.

In FIG. 1, shown is an adapter according to an embodiment of the invention. In FIG. 1, the adapter 100 includes a hooking portion 200, an attaching portion 300, and a connecting portion 400. The attaching portion 300 is connected to the hooking portion 200 via the connecting portion 400, and is a portion that is configured to be attached to a bracket of a windshield wiper blade. The attaching portion 300 and the hooking portion 200 are separated by a gap 402. The attaching portion 300 includes a main body 310 formed of a pair of main walls 311, a pair of lateral walls 312, a top surface 313, and corners 314. The main walls 311 are formed perpendicular to the top surface 313, and in turn, the side walls 312 are formed perpendicular to both the main walls 311 and the top surface 313. Accordingly, the main walls 311, the side walls 312 and the top surface 313 form a shell.

In the embodiments of the invention, the corners 314 are shown as being rounded, but in other embodiments of the invention, the corners 314 may be sharp or with edges. The main body also includes a pair of recess flanges 320 that define a recess 321 having a receiving slot 322. The receiving slot 322 may be rounded, and the recess 321 may have a flared opening. Disposed between the respective recess flanges 320 and the main wall 311 are slits 323 that allow for the recess flanges 320 to bend outward. The recess flanges 320, the recess 321, and the slits 323 extend perpendicularly from the top surface 313. Accordingly, the recess flanges 320, the recess 321, and the slits 323 are generally parallel. The main body 310 is generally symmetrical about a middle portion of the main body 310 where the recess 321 is located.

FIG. 2 shows another perspective view of the adapter according to an embodiment of the invention from a different angle. The hooking portion 200 includes a body 210 formed of side plates 211, and a connector 220 formed in between the side plates 211 and connecting the side plates 211. The hooking portion 200 further includes lower locks 230 and upper locks 260. The body 210 has a first portion 212 and a second portion 213 that are generally symmetrical about a middle portion of the body 210 where the lower locks 230 and the upper locks 260 are located. The pair of side plates 211 extend parallel to each other.

The connector 220 has rounded portions 221, a surface 222, and apertures 223. The apertures 223 are disposed between the rounded portions 221 and the surface 222.

The connecting portion 400 is attached to one of the plates 211 of the hooking portion 200 and to one of the main walls 311 of the attaching portion 310. A surface 401 of the connecting portion 400 extends between the one of the plates 211 and the one of the main walls 311.

In embodiments of the invention, the hooking portion 200 and the attaching portion 300 are positioned in a side-by-side configuration and are parallel to each other.

FIG. 3 shows a perspective view from a bottom angle of the adapter according to an embodiment of the invention. As shown in FIG. 3, the hooking portion 200 includes lower locks 230 extending through holes in one of the plates 211. The lower locks 230 are connected to pedals 232 through arms 231. The pedals 232 are attached to wings 236. The pedals 232 include first stoppers 235. In turn, the wings 236 are also attached to vanes 233 that are attached to the plates 211, whereby slits 234 separate the vanes 233 from the pedals 232.

The arms 231 are parallel to each other, and are also parallel to the wings 236. The pedals 232 are parallel to each other, and are also parallel to the vanes 233 and the slits 234. Accordingly, the arms 231 are perpendicular to the pedals 232, the vanes 233, and the slits 234. The first stoppers 235 have ramp shapes, and have bases that are attached to the pedals 232. The first stoppers 235 have inclined surfaces that extend away from the surfaces of the pedals 232. As shown in FIG. 3, the lower locks 230 are disposed below the connector 220. Support bars 240 are formed on one of the side plates 211.

In embodiments of the invention, the upper locks 260 are connected to surfaces (or wings) 226 in a similar manner as the connection between the lower locks 230 to the wings 236.

As also shown in FIG. 3, the attaching portion 300 includes outer walls 315 and inner walls 316. In FIG. 3, alignment of the recess flanges 320 are shown. For example, the recess flanges are parallel to each other, and a pair of recess flanges 320 that are aligned from one later side to an opposite later side of the attaching portion 300 are parallel to the inner walls 316. In view of FIG. 1, the outer walls 315 include the main walls 311 and the side walls 312. Accordingly, the inner walls are disposed between the recess flanges 320 and the side walls 312.

Also, as shown in FIG. 3, the hooking portion 200 and the attaching portion 300 are parallel to each other. Moreover, the hooking portion 200 and the attaching portion 300 are together symmetrical about an axis that extends from the lower locks to the recess 321.

FIG. 4 shows a perspective view of the adapter according to an embodiment of the invention cooperating with a 9×4 hook. First, FIG. 4 shows the hooking portion 200 with various hole and recess configurations in one of the side plates 211. The side plate 211 includes a first hole 250, a second hole 251, a third hole 252, and a fourth hole 253. Also, the side plate 211 has a first recess 255, a second recess 256, a first extension 255 and a second extension 257. As shown in FIG. 4, each of the first, second, third and fourth holes 250, 251, 252 and 253, each of the first and second recesses 255, 256, and each of the first and second extensions 255, 257 have a symmetrical counterpart about a beam 258.

As shown in FIG. 4, a hook 600 may be engaged to the hooking portion 200, so that the hook 600 grabs the connector 220. Also, the attaching portion 300 may be engaged to a bracket 500 of a windshield wiper blade. Accordingly, the hook 600 is attached to the bracket 500 through the adapter 100. In FIG. 4, shown is a 9×4 hook.

On the other hand, as shown in FIG. 5, a hook 700 may be engaged to the hooking portion 200, so that the hook 700 grabs the connector 220. Also, the attaching portion 300 may be engaged to a bracket 500 of a windshield wiper blade. Accordingly, the hook 700 is attached to the bracket 500 through the adapter 100. In FIG. 5, shown is a 9×3 hook.

FIG. 6 shows a view of the adapter according to an embodiment of the invention cooperating with a hook of a windshield wiper arm. In particular, FIG. 6 shows a cross sectional view of the hooking portion 200 and the hook 600. The cross sectional view of the hooking portion 200 reveals inner details of the connector 220. For example, the connector 220 includes lower surfaces (or wings) 226 and second stoppers 225. The second stoppers 225 have ramp shapes, and have bases that are attached to the lower surfaces 226. The second stoppers 225 have inclined surfaces that extend away from the lower surfaces 226.

When the hooking portion 200 and the hook 600 are engaged, an end 601 of the hook 600 becomes wedged between two first stoppers 235, and at least one of the first stoppers 235 rests within an aperture 602 of the hook 600. To release the end 601 of the hook 600 from the two first stoppers 235, the lower locks 230 may be urged upward so that the first stoppers 235 will move out of the way of the end 601 of the hook 600.

Alternatively, when the hooking portion 200 and the hook 700 are engaged, an end of the hook 700 may become wedged between the two second stoppers 225. To release the end of the hook 700 from the two second stoppers 255, the upper locks 260 may be urged upward so that the second stoppers 235 will move out of the way of the end of the hook 700.

The invention thus being described, it will be obvious that the same may be varied in many ways. For example, an upper surface of each side wall of the bracket may have a notch formed therein if necessary to accommodate various adapters. Such variations are not to be regarded as a departure from the spirit and scope of the invention, and all such modifications as would be obvious to one skilled in the art are intended to be included within the scope of the following claims.

What is claimed:

1. An adapter for a windshield wiper assembly, the adapter comprising:
   an elongated hooking portion adapted to selectively receive a left hand drive hook or a right hand drive hook of a wiper arm, the hooking portion including:
      a body formed of side plates that are parallel to each other along the length of the hooking portion; and
      a connector extending between the side plates such that the side plates extend above and below the connector, the connector extending parallel to the side plates;
   an elongated attaching portion adapted to be connected to a wiper; and
   a connection portion attached to the hooking portion and the attaching portion at opposite ends,
   wherein the hooking portion and the attaching portion are positioned in a side-by-side configuration and are parallel to each other, and
   wherein the hooking portion is symmetrical about a plane transverse to a central portion thereof so to be capable of selectively receiving the left hand drive hook or the right hand drive hook of the wiper arm on opposing ends.

2. The adapter of claim 1, wherein the attaching portion comprises:
   a main body including a pair of recess flanges that define a recess having a receiving slot; and
   slits in the main body that that allow for the recess flanges to bend outward.

3. The adapter of claim 1, wherein the hooking portion further comprises lower locks and upper locks disposed at a middle portion of the body.

4. The adapter of claim 3, wherein one of the side plates include an aperture to enable the lower locks and the upper locks to extend through the one side plate.

5. The adapter of claim 3, wherein the body has a first portion and a second portion that are generally symmetrical about the middle portion of the body where the lower locks and the upper locks are located.

* * * * *